Sept. 3, 1929.

F. L. PIVOTO

VALVE MECHANISM

Re. 17,424

Original Filed Aug. 18, 1927

Felix L. Pivoto INVENTOR.
BY
Hardway & Cattey
ATTORNEYS

Reissued Sept. 3, 1929.

Re. 17,424

UNITED STATES PATENT OFFICE.

FELIX L. PIVOTO, OF BEAUMONT, TEXAS.

VALVE MECHANISM.

Original application filed August 18, 1927, Serial No. 213,802, Patent No. 1,676,666, dated July 10, 1928. Application for reissue filed December 10, 1928, Serial No. 325,062, reissue No. 17,306, dated February 5, 1929. Application for this reissue filed July 1, 1929. Serial No. 375,261.

This invention relates to new and useful improvements in a valve mechanism.

One object of the invention is to provide a valve mechanism specially adapted for use in connection with a set shoe with which the lower end of the screen or pipe is equipped, when setting the same in a well, and having a protecting screen therefor.

Another object of the invention is to provide a novel type of fluid back pressure valve in connection with a valve guide and valve protecting screen.

A further feature of the invention is to provide a novel type of back pressure valve adapted to be assembled with a set shoe and of such construction as to provide for a greater clearance for the passage of fluid than is the case with back pressure valves now in common use for such purposes and embodying also a novel type of screen for protecting the valve from the accumulation of foreign matter.

With the above and other objects in view the invention has particular relation to certain novel features of construction, operation and arrangement of parts, an example of which is given in this specification and illustrated in the accompanying drawings, wherein:—

Figure 1:
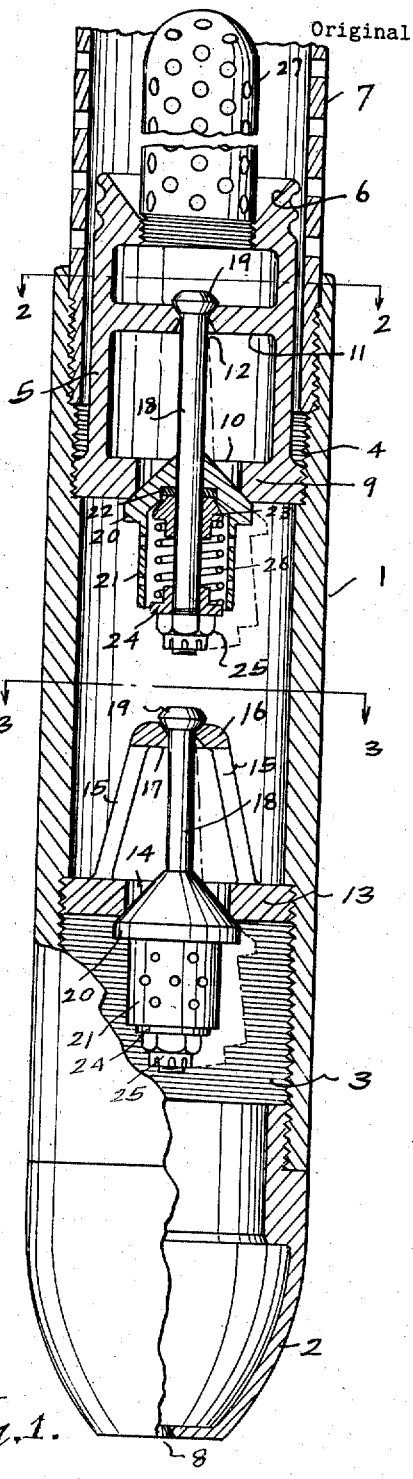
Figure 1 shows a vertical sectional view of a set shoe attached to the lower end of a well screen and showing the back pressure valves assembled therewith.
Figure 2:
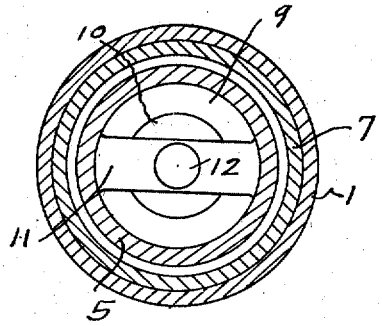
Figure 2 shows a cross sectional view taken on the line 2—2 of Figure 1.
Figure 3:
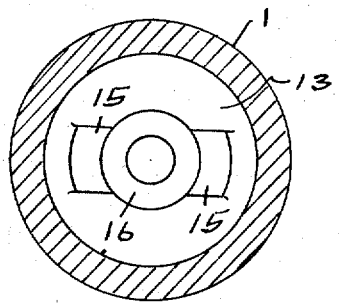
Figure 3 shows a cross sectional view taken on the line 3—3 of Figure 1.

Referring now more particularly to the drawings, wherein like numerals of reference designate similar parts in each of the figures, the numeral 1 designates a tubular set shoe of conventional construction whose lower end is contracted and of oval formation, as at 2, so that it will readily follow the course of the bore in setting the screen or other pipe to which the set shoe is attached. This lower end is detachable and is threaded up into a section of the shoe above it which is internally threaded as at 3. The upper end of the set shoe is internally threaded as at 4, and a tubular wash pipe seat 5 is screwed therein and has its upper end 6 flared to receive the lower end of the wash pipe. The set shoe is attached to the lower end of the well screen 7, and the seat 5 is spaced inwardly from the set shoe to provide space to receive the lower end of said screen 7, so that said screen may be connected to said set shoe. When the screen or pipe 7 is set, and it is desired to wash the outside of the same, a wash pipe is lowered therein and its lower end is seated in the flared upper end of the seat 5 and clean water is forced down through said wash pipe, said water passing on down through the valves, assembled with the set shoe, and hereinafter described, and passes out through the opening 8 at the lower end of the set shoe and up around said screen.

Normally however, said valves are closed to prevent the inflow of fluid into the screen 7 up through said set shoe. The lower end of the wash pipe seat 5 is formed with an annular valve seat 9 having a central opening 10. Spanning the wash pipe seat 5 and preferably formed integral therewith there is a spider 11, above the valve seat, having a central bearing 12 which is preferably flared each way. The numeral 13 designates the lower annular valve seat which is screwed up into the set shoe 1 and which has a central opening 14. Formed integrally within the valve seat 13 there is a spider preferably consisting of the oppositely disposed upwardly converging legs 15, 15, whose upper ends are united by a ring 16 having a central bearing 17 therethrough which is flared each way. There are the upper and lower valve stems 18, 18, which depend through the respective bearings 12, 17 and whose upper ends are formed with heads 19, 19 having convex surfaces which work in downwardly converging joints into which the upper ends of the respective bearings 12, 17 are formed. There are the conical shaped back pressure valves 20, 20 slidingly mounted on the respective stems 18, 18 and these respective valves have the depending housings 21, 21, which are perforated or formed of foraminated material. These valves normally control the openings 10, 14 respectively and prevent the upward passage of fluid through the set shoe but open to permit the downward passage thereof. Within each housing 21 there is a packing 22 which closely surrounds the corresponding stem 18 and prevents leakage up through the valves and which are held in place by glands as 23 fitted around the stems and held against the underside of said packing rings. There are the washers 24 which are maintained on the lower ends of the stems, by the nuts 25 screwed thereon, and fit closely within said housings and between the washers 24 and the corresponding glands 23 and surrounding the stems 18 there are the coil springs as 26 which normally operate to hold the glands 23 against the packing 22 as well as to maintain the valves 20 seated. The seats 12 and 17 are so formed as to permit the stems 18 to freely swing laterally in any direction when the corresponding valves are open by fluid pressure from above and this permits said valves also to swing laterally as indicated in dotted lines in Figure 1. This freedom of movement of the valves provides a greater clearance for the additional passage of fluid as well as the passage of foreign matter through the openings 10 and 14.

In order to prevent the entrance of foreign matter into the valves, particularly large particles of foreign matter which are liable to clog said valves, I have provided a tubular screen as 27 whose upper end is closed and whose lower end is threaded into the upper end of the wash pipe seat 5 within the flared upper end 6 thereof. This screen is perforated or foraminated and may be of a length to give the required screening capacity and it will be effective to exclude particles of foreign matter from the valves by which they are liable to be clogged or held open. This screen is threaded into the wash pipe by means of left hand threads.

The housings 21 are also perforated, as hereinbefore stated, so that any foreign matter collecting therein may be readily ejected.

While I have shown what I now consider the preferred form of this valve mechanism, it is obvious that various mechanical changes may be made therein and equivalents substituted for the parts shown and it is contemplated that such changes and adaptations may be made in the structure and such equivalents substituted, as are comprehended within the scope of the appended claims.

What I claim is:

1. A valve mechanism including a valve seat having an opening, a downwardly opening valve controlling said opening, a bearing member above said seat having a bearing therein, a stem supporting the valve and working through and having a swiveling connection with said bearing, a yieldable member associated with the stem and normally holding said valve in closed position, a screen disposed above the seat and provided to exclude foreign matter therefrom.

2. A valve mechanism including a valve seat having an opening, a downwardly opening valve controlling said opening, a spider disposed above said seat and formed with a bearing aligned with said opening, a valve stem to the lower end of which said valve is connected, said stem working through said bearing and having a universal connection therewith to provide free lateral play of the valve relative to the seat, means normally holding said valve yieldingly against said seat and a screen disposed above the seat and provided to exclude foreign matter therefrom.

3. A valve mechanism including a seat having an opening, a spider disposed above the seat and having a bearing aligned with said opening, a stem extending through said bearing and sustained thereby, a valve associated with the lower end of said stem and normally closing said opening, said valve having a depending foraminated housing, an abutment carried by the lower end of the stem, a yieldable member enclosed within said housing and interposed between said valve and abutment and normally holding the valve yieldingly against its seat in position to close the opening thereof.

4. A valve mechanism including a seat having an opening therethrough, a spider disposed above said seat, a downwardly opening valve controlling said opening, a stem on which the valve is slidably mounted, the upper end of said stem having a head which has a swiveling connection with said spider, an abutment carried by the lower end of the valve stem, a foraminated housing depending from said valve, a yieldable member enclosed by said housing and interposed between said abutment and valve and normally holding the valve yieldingly against its seat in position to close said opening.

5. A valve mechanism including a seat having an opening therethrough, a spider disposed above said seat, a downwardly opening valve controlling said opening, a stem on which said valve is mounted, the upper end of the stem having a head which has a swivelling connection with said spider, an abutment carried by the lower end of the valve stem, a yieldable member interposed between said abutment and valve and normally holding the valve yieldingly against its seat in position to close said opening, a housing carried by the valve and enclosing said yieldable member, said housing being provided with perforations.

6. A valve mechanism including a valve seat having an opening therethrough, a spider disposed above said seat and having a bearing, a valve stem whose upper end has a swiveling connection with said spider and which works through said bearing and opening, a downwardly opening valve controlling said opening and having a bearing on said stem, a foraminated housing depending from said valve, a packing within the housing around the stem, a gland in the housing abutting said packing, an abutment carried by the lower end of the stem, a yieldable member interposed between said abutment and gland and enclosed by said housing.

7. A valve mechanism including a valve seat having an opening therethrough for the passage of fluid, a downwardly opening valve controlling said opening, an anchor associated with said seat, a valve stem sustained by the anchor and having a swinging connection therewith, said valve being connected to said stem, a foraminated housing depending from the valve, a yieldable member within said housing and sustained by said stem and normally operating to hold the valve yielding against said seat and in position to close said opening.

8. A valve mechanism including a tubular supporting member, a valve seat therein, having an opening, a downwardly opening valve controlling said opening, an anchor associated with said seat, a valve stem sustained by the anchor and having a swinging connection therewith, said valve being connected to said stem, a housing depending from the valve, a yieldable member within said housing and sustained by the stem and normally operating to hold the valve yieldingly against said seat and in position to close said opening.

9. A valve mechanism including a valve seat having an opening therethrough for the passage of fluid, a downwardly opening valve controlling said opening, an anchor associated with said seat, a valve stem sustained by the anchor and having a swinging connection therewith, said valve being connected to said stem, a yieldable member sustained by the stem and normally operating to hold the valve yieldingly against said seat and in position to close said opening.

10. A valve mechanism including a tubular member having a valve seat in its lower end provided with an opening, a transverse spider in said tubular member above said seat having a bearing, a stem fitted through said bearing and having a swinging connection therewith and extending through said opening, a downwardly opening valve slidable on said stem and controlling said opening, a yieldable member sustained by the stem and normally operating to hold the valve yieldingly against said seat in position to close said opening.

11. A valve mechanism including a tubular member having a valve seat in its lower end provided with an opening, a transverse spider in said tubular member above said seat having a bearing, a stem fitted through said bearing and having a swinging connection therewith and extending through said opening, a downwardly opening valve slidable on said stem and controlling said opening, a yieldable member sustained by the stem and normally operating to hold the valve yieldingly against said seat in position to close said opening, and a screening device attached to the upper end of said tubular member.

12. A valve mechanism including a valve seat having an opening, a downwardly opening valve controlling the opening, a bearing member above said seat having a bearing therein, a stem supporting the valve and working loosely through said bearing, and having a swinging connection therewith to permit the free swinging of said valve, and a yieldable member associated with the stem and normally holding said valve in closed position.

13. A valve mechanism including a valve seat having an opening, a downwardly opening valve controlling said opening, a cage mounted on said seat and formed with a bearing aligned with said opening, a valve stem to the lower end of which said valve is connected, said stem working through said bearing and having a swivelling connection with the cage to permit free lateral play of the valve and means normally holding said valve yieldingly against said seat.

14. A valve mechanism including a valve seat having an opening therethrough, a valve cage carried by said seat and formed with a bearing aligned with said opening, a valve stem working through the cage and bearing and having a lateral or swinging movement relative to the cage, and having a universal connection with the cage, a valve disposed on the opposite side of the seat from the cage, said valve being connected to the stem and controlling said opening and means normally holding said valve yieldingly against said seat.

15. A valve mechanism including a valve seat having an opening therethrough, a valve cage above the seat and formed with a bearing aligned with said opening, a valve disposed opposite the cage and controlling said opening, a valve stem having a universal connection with the cage and to which the valve is connected, said stem working through said cage bearing and having a lateral or swinging movement relative to the cage and seat, a yieldable member associated with the stem and normally operating to hold said valve seated to close said opening.

16. A valve mechanism including a seat having an opening therethrough, a cage disposed above said seat, a downwardly opening valve controlling said opening, a stem on which the valve is slidably mounted, the upper end of said stem having a head having a swivelling connection with the cage, an abutment carried by the lower end of the valve stem, a yieldable member interposed between said abutment and valve and normally holding the valve yieldingly against its seat in position to close said opening.

17. A valve mechanism including a seat having an opening therethrough, a cage disposed above said seat, a downwardly opening valve controlling said opening, a stem on which the valve is slidably mounted, the upper end of said stem having a head having a swiveling connection with the cage, an abutment carried by the lower end of the valve stem, a yieldable member interposed between said abutment and valve and normally holding the valve yieldingly against its seat in position to close said opening, a housing carried by the valve and enclosing said yieldable member.

18. A valve mechanism including a valve seat having an opening therethrough, a cage disposed above said seat and having a bearing, a valve stem whose upper end has a swivelling connection with the cage and which works through said bearing and opening, a valve controlling said opening and having a bearing on said stem, a housing depending from said valve, a packing within said housing around the stem, a gland in the housing abutting said packing, an abutment carried by the lower end of the stem and a yieldable member interposed between said abutment and gland and enclosed by said housing.

19. A valve mechanism including a valve seat having an opening therethrough for the passage of fluid, a valve controlling said opening, an anchor associated with said seat, a valve stem sustained by the anchor and having a swinging connection therewith, said valve being connected to said stem and means associated with the stem and normally holding the valve yieldingly against the seat and in position to close said opening.

20. A device of the character described including a tubular set shoe, an annular valve seat therein having a tubular member upstanding therefrom, spaced inwardly from the set shoe, a yieldably mounted downwardly opening valve controlling said seat, and a tubular screen attached to said tubular member and upstanding therefrom.

21. A device of the character described including a tubular set shoe, a valve seat anchored therein, a downwardly opening valve controlling said seat, means normally holding the valve closed, a tubular screen anchor upstanding from the valve seat, a tubular screen attached to and upstanding from said screen anchor.

22. A device of the character described including a tubular set shoe, a valve seat anchored therein, a downwardly opening valve controlling said seat, means normally holding the valve closed, a tubular screen anchor upstanding from the valve seat, said screen anchor being spaced inwardly from said set shoe to provide space between the set shoe and screen anchor for the reception of a tubing to be attached to the upper end of said set shoe and a tubular screen attached to and upstanding from said anchor.

23. A device of the character described including a tubular set shoe, a valve seat anchored therein, a downwardly opening valve controlling said seat, means normally holding the valve closed, a tubular screen attached to and upstanding from said seat and spaced inwardly from the set shoe.

In testimony whereof I have signed my name to the specification.

FELIX L. PIVOTO.